US009240200B2

(12) United States Patent
Covington et al.

(10) Patent No.: US 9,240,200 B2
(45) Date of Patent: Jan. 19, 2016

(54) MAGNETIC ELEMENT WITH CROSSED ANISOTROPIES

(71) Applicant: Seagate Technology LLC, Cupertino, CA (US)

(72) Inventors: Mark William Covington, Edina, MN (US); Victor Boris Sapozhnikov, Minnetonka, MN (US); Wonjoon Jung, Eden Prairie, MN (US); Dimitar Velikov Demitrov, Edina, MN (US); Dian Song, Eden Prairie, MN (US); Taras Pohkil, Arden Hills, MN (US)

(73) Assignee: Seagate Technology LLC, Cupertino, CA (US)

( * ) Notice: Subject to any disclaimer, the term of this patent is extended or adjusted under 35 U.S.C. 154(b) by 25 days.

(21) Appl. No.: 13/687,920

(22) Filed: Nov. 28, 2012

(65) Prior Publication Data
US 2014/0146419 A1    May 29, 2014

(51) Int. Cl.
G11B 5/39      (2006.01)
G11B 5/31      (2006.01)

(52) U.S. Cl.
CPC ............ *G11B 5/3163* (2013.01); *G11B 5/3906* (2013.01); *G11B 5/398* (2013.01); *G11B 5/3932* (2013.01)

(58) Field of Classification Search
None
See application file for complete search history.

(56) References Cited

U.S. PATENT DOCUMENTS

| | | | |
|---|---|---|---|
| 6,599,401 B1 | 7/2003 | Wang et al. | |
| 7,382,586 B2 | 6/2008 | Carey et al. | |
| 7,382,642 B2 | 6/2008 | Boeve | |
| 8,015,694 B2 | 9/2011 | Carey et al. | |
| 8,130,475 B2 | 3/2012 | Kawamori et al. | |
| 8,179,642 B2 | 5/2012 | Kawamori et al. | |
| 8,233,247 B2* | 7/2012 | Carey et al. | 360/324 |
| 2002/0135954 A1* | 9/2002 | Yoshikawa et al. | 360/324.12 |
| 2003/0214764 A1* | 11/2003 | Sapozhnikov et al. | 360/324.2 |
| 2008/0102316 A1* | 5/2008 | Akimoto et al. | 360/234.3 |
| 2009/0154025 A1* | 6/2009 | Carey et al. | 360/314 |
| 2009/0257154 A1* | 10/2009 | Carey et al. | 360/324.12 |
| 2012/0270073 A1* | 10/2012 | Covington et al. | 428/812 |
| 2013/0065085 A1* | 3/2013 | Dimitrov et al. | 428/810 |

FOREIGN PATENT DOCUMENTS

JP    2007-525005 A    8/2007
JP    2012-230752 A    11/2012

* cited by examiner

*Primary Examiner* — Craig A. Renner
(74) *Attorney, Agent, or Firm* — Hall Estill Attorneys at Law

(57) ABSTRACT

A magnetic element may be configured with at least a magnetic stack having first and second magnetically free layers that each has a predetermined stripe height from an air bearing surface (ABS). The first and second magnetically free layers can respectively be configured with first and second uniaxial anisotropies that are crossed in relation to the ABS and angled in response to the predetermined stripe height.

20 Claims, 4 Drawing Sheets

MAGNETIC ELEMENT WITH CROSSED ANISOTROPIES

SUMMARY

Various embodiments of the present disclosure are generally directed to a magnetic element that is capable of data sensing.

In accordance with some embodiments, a magnetic element may be configured with at least a magnetic stack having first and second magnetically free layers that each has a predetermined stripe height from an air bearing surface (ABS). The first and second magnetically free layers can respectively be configured with first and second uniaxial anisotropies that are crossed in relation to the ABS and angled in response to the predetermined stripe height.

DETAILED DESCRIPTION

The data storage industry continues to advance to higher data capacity, faster data access times, and reduced form factors. Such considerations can correspond with smaller data storage components and tighter dimensional tolerances that can lead to magnetic instability and noise that inhibits efficient data access. While magnetic biasing schemes may be used to mitigate magnetic instability, process and design variations can reduce the effectiveness of such biasing schemes. As such, there is a continued industry demand for magnetic instability mitigation in reduced form factor, high data bit density storage devices.

Accordingly, a magnetic element may be configured with a magnetic stack having first and second magnetically free layers that each have a predetermined stripe height from an air bearing surface (ABS) and respectively have first and second uniaxial anisotropies that are crossed in relation to the ABS and angled in response to the predetermined stripe height. The ability to tune the angles of the uniaxial anisotropies to the stripe heights may mitigate operational noise as the free layers switch between degenerate configurations without being inhibited by inadvertent thermal switching and high magnetic asymmetry.

Figure 1:
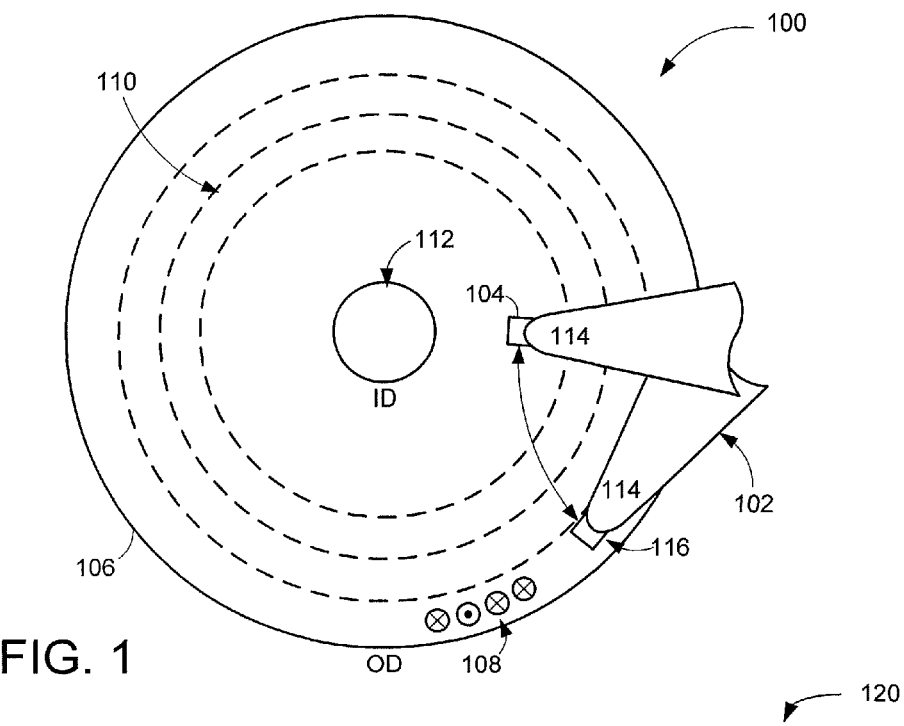
FIG. 1 is a block representation of an example portion of a data storage device.

While tuned uniaxial anisotropies may be practiced in a variety of non-limiting environments, FIG. 1 generally illustrates a top view block representation of an example data storage device 100 that can utilize a tuned magnetic element in accordance with various embodiments. The data storage device 100 is shown in a non-limiting configuration that has an actuating assembly 102 that positions a transducing head 104 over a magnetic storage media 106, such as proximal the inner diameter (ID) or the outer diameter (OD), that is capable of storing programmed bits 108 on predetermined data tracks 110. The storage media 106 can be attached to a spindle motor 11 that rotates during use to produce an air bearing surface (ABS) on which a slider portion 11 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks 110 of the storage media 106, respectively. In this way, controlled motion of the actuating assembly 102 causes the transducers to align with the data tracks 110 defined on the storage media surfaces to write, read, and rewrite data.

It should be noted that the term "stack" is an unlimited term within this disclosure that can be one or more magnetic and non-magnetic layers capable of magnetic shielding, reading, and writing. Throughout the present application, the term "stack" will be understood to mean a component positioned on the ABS to conduct magnetic flux in accordance with predetermined characteristics, such as rotating the magnetization of a magnetic free layer, inducing a magnetic polarity onto an adjacent data storage media, and directing flux away from a data sensing region of a magnetic element.

Figure 2:
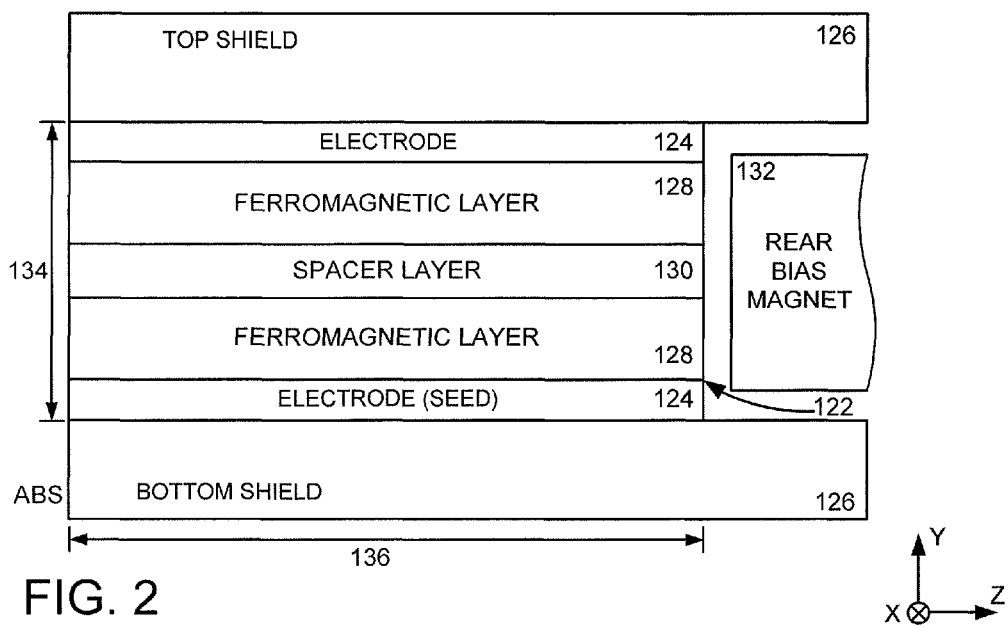
FIG. 2 provides a cross-sectional block representation of a portion of the data storage device displayed in FIG. 1.

As data bits 108 become more densely positioned in the data tracks 110, the head 104 may receive magnetic flux from a variety of adjacent data bits that provides noise and magnetic asymmetry due at least in part to the physical size of the magnetically sensitive aspects of the head 104 on the ABS. Various magnetically sensitive stack designs have been advanced to reduce the ABS size of the head 104 and mitigate the effects of errant magnetic flux. FIG. 2 displays a cross-section block representation of an example magnetic element 120 capable of being used in the data storage device 100 of FIG. 1. The magnetic element 120 is shown as configured in accordance with some embodiments with a magnetic stack 122 disposed between electrode layers 124 and magnetic shields 126 on an air bearing surface (ABS).

The magnetic stack 122 can be configured as a variety of different data bit sensing laminations, such as a magnetoresistive, tunnel magnetoresistive, and spin valve, but in the embodiment shown in FIG. 2 is constructed as a "trilayer" sensor with dual ferromagnetic free layers 128 separated by a non-magnetic spacer layer 130. The trilayer magnetic stack 122 can be characterized by the pair of magnetically sensitive ferromagnetic layers that are biased to a default magnetization by an adjacent, but physically separate, rear bias magnet 132 as opposed to contact with a fixed magnetization reference structure. That is, the magnetic stack 122 lacks any fixed magnetizations, which reduces the shield-to-shield spacing 134 and reduces the magnetic stress on the vertical and side shields.

The magnetic orientations of the free layers 128 may act to provide a measureable magnetoresistive effect when an external data bit is encountered and alters a predetermined default magnetization of one, or both free layers 128 by scissoring the magnetization of the layer between quiescent and activated states. The size, placement, and magnetic coercivity of the rear bias magnet 132 may be tuned and configured to provide predetermined bias magnetization that acts in conjunction with anisotropy of the ferromagnetic free layers 128 to robustly set a quiescent magnetization in each free layer 128.

Figure 3:
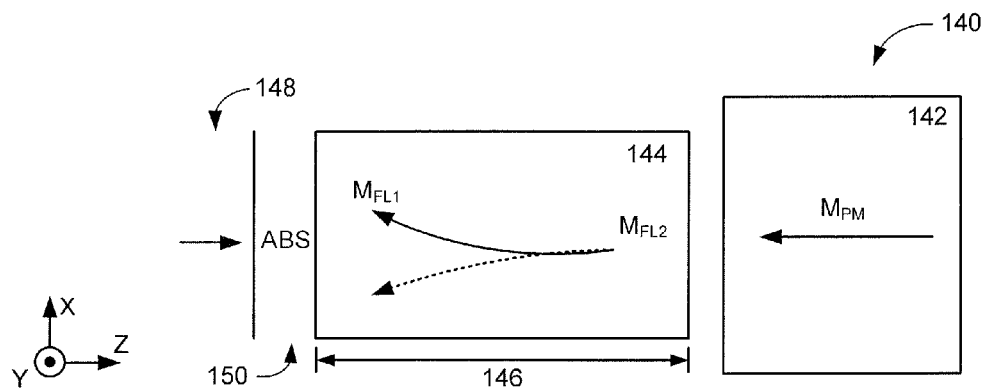
FIG. 3 shows a top block representation of a portion of an example magnetic element constructed in accordance with various embodiments.

The use of the rear bias magnet 132 can be tuned with respect to the stripe height 136 of the magnetic stack 122, as measured from the ABS along the Z axis, and the anisotropy of the free layers 128 to allow precise scissoring of crossed free layer 128 magnetizations to sense data bits. FIG. 3 shows a top block representation of portions of an example magnetic element 140 that generally illustrates how a rear bias magnet 142 can be tuned in relation to magnetically free layers 144 in accordance with various embodiments.

The rear bias magnet 142 can be configured with a magnetic coercivity that provides a remnant magnetization ($M_{PM}$) that creates a bias field that acts in concert with the anisotropy and stripe height 146 of the free layers 144 to set default magnetizations ($M_{FL1}$ and $M_{FL2}$) to the respective free layers 144. The configuration of the free layer magnetizations with a crossed orientation characterized by opposite angled magnetization vectors may increase data signal and amplitude as the cross-track component of the anisotropy parallel to the ABS can counteract shape anisotropy of the free layers 144 to allow more responsive magnetic scissoring reactive to adjacent data bits 148 across an ABS 150.

However, the scissoring operation of the magnetizations in the free layers 128 can be detrimentally effected by magnetic noise that can inadvertently induce thermal switching and inaccurate data sensing. With those difficulties in mind, the tuning of the in-plane uniaxial anisotropies of the free layers 128 in a trilayer magnetic stack 122 with respect to the stripe height can mitigate magnetic noise and inadvertent magnetization switching by suppressing magnetic asymmetry in each magnetically free layer 128.

Figure 4:
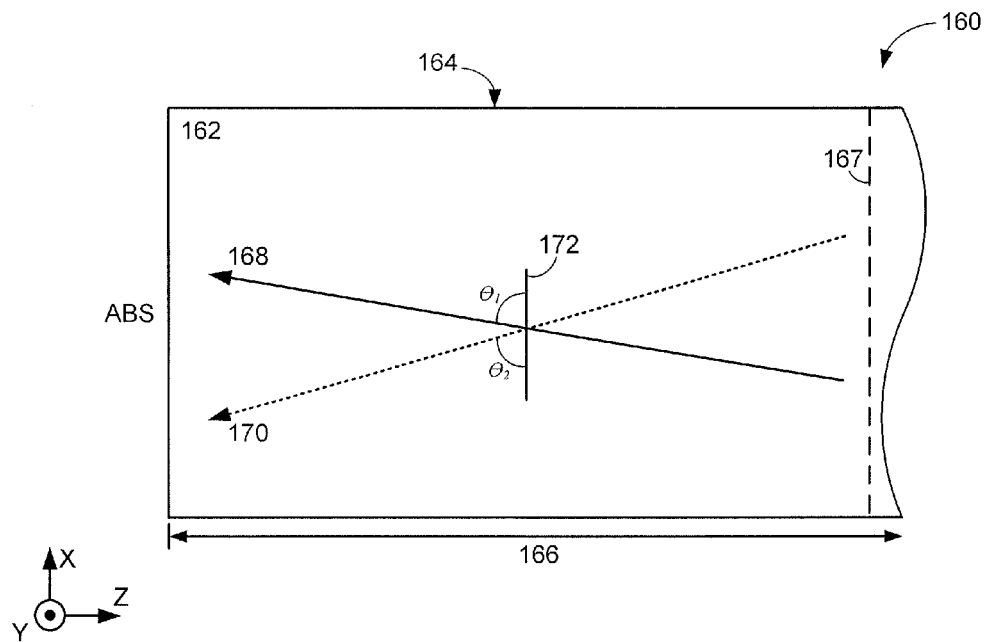
FIG. 4 displays a top block representation of a portion of an example magnetic element constructed in accordance with some embodiments.

FIG. 4 provides a top view block representation of a free layer portion 160 of an example magnetic stack constructed in accordance with various embodiments. The free layer portion 160 has first 162 and second 164 magnetically free layers constructed as a stack with matching widths, along the X axis and perpendicular to the Y axis, and stripe heights 166 that can be the same, or different lengths from the ABS, as shown by segmented line 167 that corresponds to the first free layer 162 having a shorter stripe height 166 than the second free layer 164. Lengthening the stripe heights 166 of one, or both, magnetically free layers 162 and 164 can bring the solid first 168 and segmented second 170 magnetizations of the respective free layers 162 and 164 close to parallel, which can inadvertently induce the magnetizations to switch and modify the magnetic sensing accuracy of the free layer portion 160.

Through judicious tuning of the first 168 and second 170 magnetizations to the crossed orientation shown in FIG. 4, the shape anisotropy of the free layers 162 and 164 can be counteracted and magnetic asymmetry and noise can be suppressed. That is, the tuning of the first magnetization to a first vector direction with a first predetermined angular orientation $\Theta_1$ with respect to the X axis and transverse axis 172 of the free layer portion 160 and the second magnetization tuned to a second vector direction and second predetermined angular orientation $\Theta_2$ with respect to the transverse axis 172 by suppressing noise and minimizing magnetic asymmetry in the respective free layers 162 and 164.

While the first and second magnetizations 168 and 170 can be set to the predetermined angular orientations $\theta_1$ and $\theta_2$ and vector directions in an unlimited variety of manners, various embodiments form the various magnetizations with oblique incidence sputtering set to a predetermined deposition angle that provides uniaxial anisotropy that suppresses magnetic noised and promotes magnetic symmetry. The predetermined angular orientations and vector directions are, in some embodiments, set in opposite orientations, as shown in FIG. 4, such as 30° and 150° that configure the magnetizations 168 and 170 with a crossed construction that provides a balance of magnetization components parallel and perpendicular to the ABS that maintains the respective orientations of the magnetizations 168 and 170 during static and dynamic operation.

The angular orientations and vector directions of the free layer magnetizations 168 and 170 may further be set by conducting an annealing operation where the free layer portion 160 is subjected to elevated heat and an applied magnetic field for a predetermined amount of time. Annealing the free layers, either individually or concurrently, with along a primary anneal direction, such as along the longitudinal and Z axis, is conducted in accordance with various embodiments to finalize the orientation of the uniaxial anisotropy of each free layer 162 and 164. As a non-limiting example, the first magnetically free layer 162 can be annealed along a first anneal direction that differs from a second anneal direction of the second magnetically free layer 164.

The use of oblique incidence sputtering set to a tuned deposition angle can be complemented, in some embodiments, by being deposited on a seed layer having a predetermined texture. That is, one, or both, free layer uniaxial anisotropies 168 and 170 may be deposited on a seed layer that is either deposited with an oblique incidence sputtering or undergone post-deposition processing, like trenching and abrasion, to produce a predetermined texture that aids in forming the predetermined uniaxial anisotropies and magnetizations 168 and 170 in the magnetically free layers 162 and 164.

Figure 5:
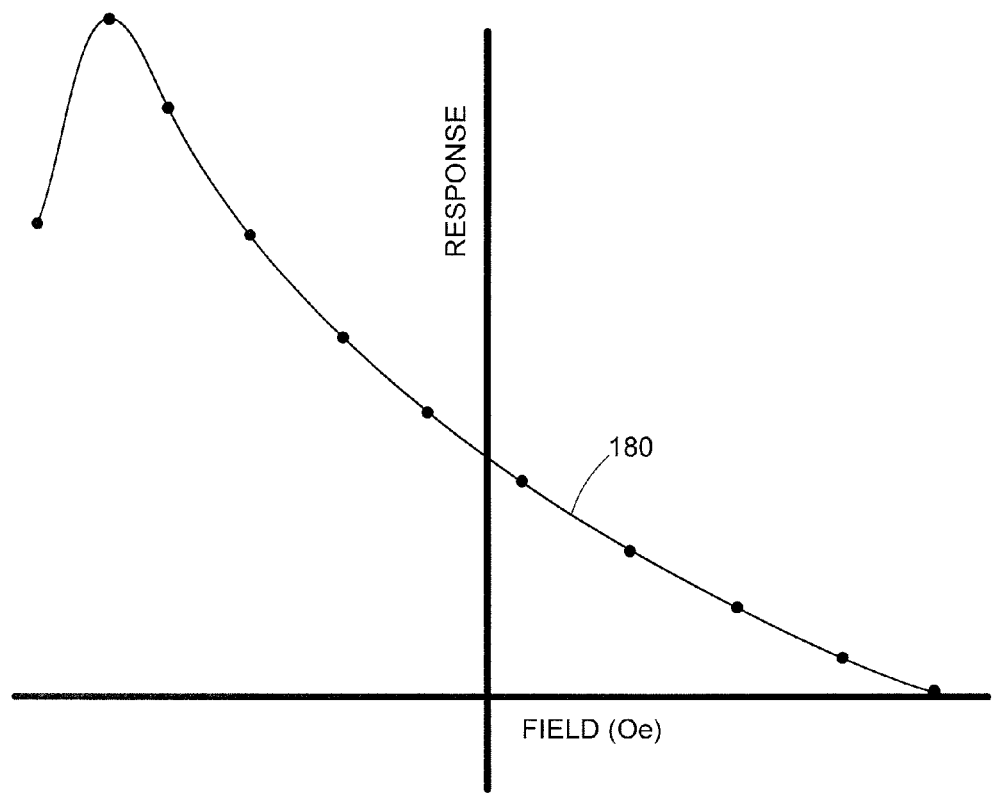
FIG. 5 graphs operational data from example magnetic elements constructed and operated in accordance with various embodiments.

Regardless of the manner in which the predetermined magnetizations 168 and 170 are constructed, the tuned angular orientations and vector directions can provide optimized data bit sensing. FIG. 5 graphs operational data corresponding to an example magnetic element tuned with predetermined magnetic free layer uniaxial anisotropies and magnetizations in accordance with various embodiments. Solid line 180 illustrates how the crossed magnetic and uniaxial anisotropy configuration of free layers in a trilayer stack can provide magnetic response optimized for a various data storage environments.

Figure 6:
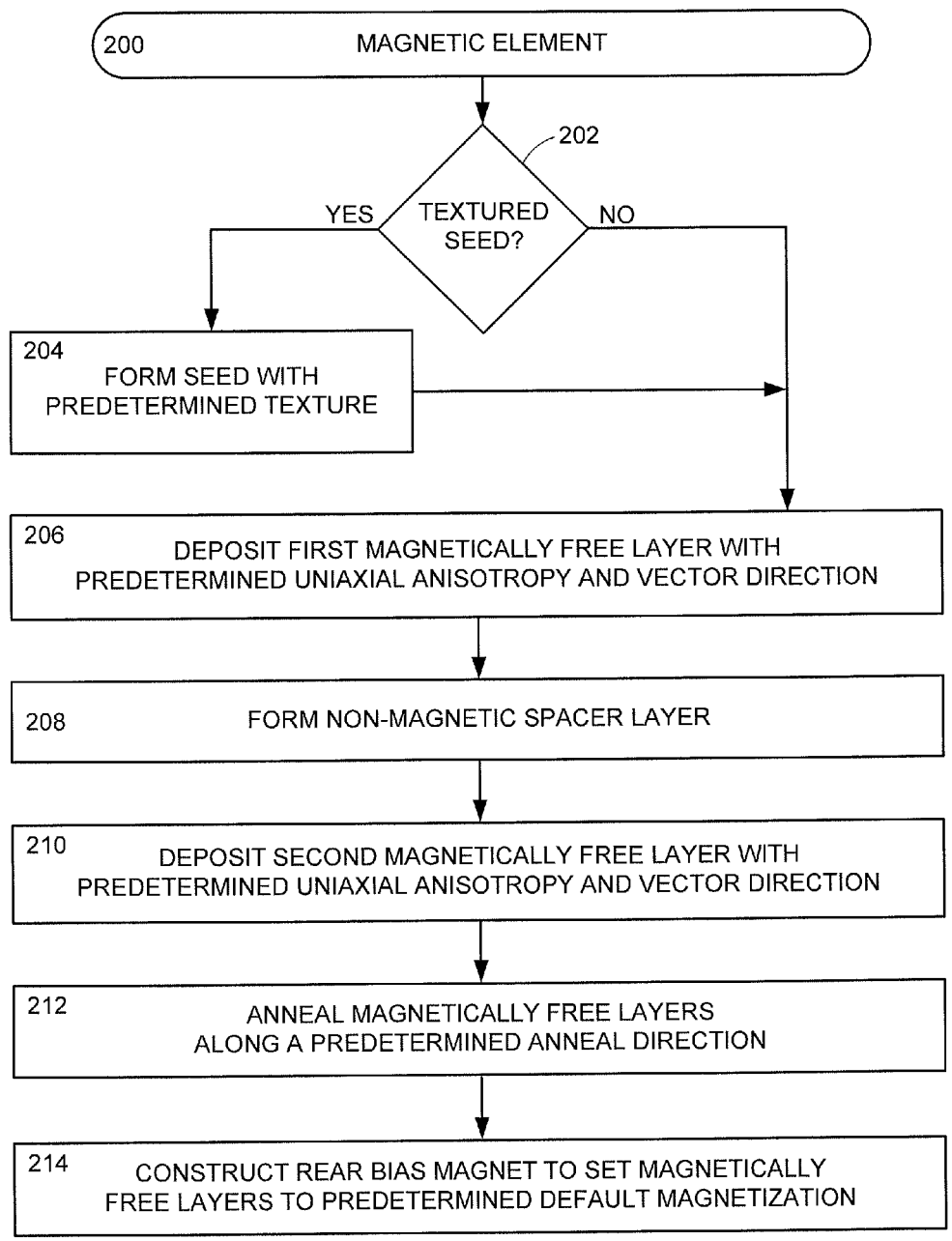
FIG. 6 provides a flowchart of a magnetic element fabrication routine conducted in accordance with various embodiments.

While the manner in which a magnetic element is tuned and the configuration of the various layers of the magnetic element are not limited to a particular means for construction, FIG. 6 provides an example magnetic element fabrication routine 200 conducted to tune a magnet stack in accordance with various embodiments. The routine 200 initially begins by determining in decision 202 whether or not a textured seed layer, such as electrode layer 124 of FIG. 2, is to be used as a substrate on which the magnetic stack is subsequently deposited.

If a textured seed is to be used, step 204 then forms a seed layer with a predetermined texture that may be formed with an unlimited variety of deposition and processing means, such as oblique incidence sputtering. Regardless of whether a textured seed layer is formed in step 204 or not chosen in decision 202, step 206 next deposits a first magnetically free layer that has a predetermined uniaxial anisotropy and vector direction. Step 206 can be conducted in an unlimited number of manners, but in some embodiments is deposited with oblique incidence sputtering angled at a predetermined deposition angle to configure the free layer with a uniaxial anisotropy that induces a magnetization oriented at a predetermined angle, such as 30° with respect to the transverse axis of the layer.

The formation of the first magnetically free layer can be followed by step 208 where a non-magnetic spacer layer is formed atop the first magnetically free layer. It should be noted that the dimensions, thickness, and material of the spacer layer and magnetically free layer are not limited and can be configured to be similar, dissimilar, and matching characteristics. Next, step 210 deposits a second magnetically free layer with a second predetermined uniaxial anisotropy and vector direction. As generally illustrated in FIG. 4, the uniaxial anisotropies and vector directions of the first and second magnetically free layers can be set to be crossed in relation to one another while leading in opposite directions, one towards the ABS and the other away from the ABS.

While the first and second magnetically free layers formed into a trilayer stack in accordance with predetermined magnetic orientations, step 212 can subsequently anneal the stack along a predetermined anneal direction, such as along the transverse axis of the free layers. In some embodiments that differ from the steps shown in FIG. 6, the first and second magnetically free layers are annealed at different temperatures and anneal directions before the subsequent deposition of another layer, such as the spacer layer. The construction of the trilayer magnetic stack can be followed by the formation of a rear bias magnet adjacent to and separated from the magnetic stack in step 214. The rear bias magnet may be configured as a single layer or lamination of layers with a physical size conducive to setting the magnetically free layers to a predetermined default magnetization.

Through the tuned deposition and annealing of the various magnetically sensitive layers and rear bias magnet, routine 200 can provide optimized magnetic stability and symmetry. However, the routine 200 is not limited as the various steps and decisions can be omitted, changed, and added. For instance, the routine 200 can further conduct steps that form and process one or more magnetic shields laterally and vertically adjacent the trilayer magnetic stack.

The ability to tune of one or more magnetically free layers with a predetermined uniaxial anisotropy induces and maintains magnetization while counteracting shape anisotropy. Tuning the respective magnetically free layers with crossed magnetizations and opposing vector directions allows for efficient magnetoresistive scissoring of the free layer magnetizations while minimizing the inadvertent switching of magnetizations between degenerate states. As such, the magnetic stack can be specifically configured to provide accurate, efficient operations catered to reduced form factor, high data bit density data storage devices.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A magnetic element comprising a magnetic stack having first and second magnetically free layers each with a stripe height from an air bearing surface (ABS) that is greater than a length of a rear bias magnet, the stripe height corresponding to a shape anisotropy having a first easy axis direction, the first and second magnetically free layers respectively configured with first and second uniaxial anisotropies crossed in relation to the ABS and angled at non-orthogonal directions different than the first easy axis direction, the non-orthogonal directions oriented substantially towards the ABS, the first and second magnetically free layers respectively comprising first and second magnetizations angled to match the first and second uniaxial anisotropies.

2. The magnetic element of claim 1, wherein the first and second magnetically free layers are separated by a non-magnetic spacer layer.

3. The magnetic element of claim 1, wherein the magnetic stack lacks a fixed reference structure and the first and second magnetically free layers are set to a default magnetization by the rear bias magnet separated from the ABS and magnetic stack.

4. The magnetic element of claim 1, wherein the first magnetically free layer is deposited with oblique incidence angle deposition.

5. The magnetic element of claim 1, wherein the first uniaxial anisotropy is configured substantially at 30° with respect to a transverse axis of the first and second magnetically free layers.

6. The magnetic element of claim 1, wherein the second uniaxial anisotropy is configured substantially at 150° with respect to a transverse axis of the first and second magnetically free layers.

7. The magnetic element of claim 1, wherein the first and second uniaxial anisotropies induce crossed magnetizations for the respective first and second magnetically free layers.

8. The magnetic element of claim 1, wherein the magnetically free layers each comprise ferromagnetic material.

9. The magnetic element of claim 1, wherein the first and second magnetically free layers have a common stripe height from the ABS.

10. The magnetic element of claim 1, wherein the first and second magnetically free layers have different stripe heights from the ABS.

11. The magnetic element of claim 1, wherein the first magnetically free layer is deposited atop a seed layer textured with a predetermined texture.

12. The magnetic element of claim 11, wherein the predetermined texture is formed with oblique incidence angle deposition.

13. An apparatus comprising a magnetic stack having first and second magnetically free layers each with a stripe height from an air bearing surface (ABS) that is greater than a length of a rear bias magnet, the stripe height corresponding to a shape anisotropy having a first easy axis direction, the first and second magnetically free layers respectively configured with first and second uniaxial anisotropies crossed in relation to the ABS, angled at non-orthogonal directions different than the first easy axis direction, and pointing in opposite directions substantially towards the ABS to balance a plurality of magnetization components parallel and perpendicular to the ABS, the first and second magnetically free layers respectively comprising first and second magnetizations angled to match the first and second uniaxial anisotropies.

14. The apparatus of claim 13, wherein the first and second free layers each have a first width measured perpendicular to the ABS, the rear bias magnet having a second width measured parallel to the first width, the second width being greater than the first width.

15. The apparatus of claim 13, wherein at least one magnetically free layer is annealed along a longitudinal axis of the magnetic stack.

16. The apparatus of claim 13, wherein the first and second uniaxial anisotropies respectively are oriented with respect to the ABS with first and second angles that correspond with third and fourth respective angles of the first and second magnetizations.

17. The apparatus of claim 16, wherein the rear bias magnet sets the first and second magnetizations to a default magnetization configuration.

18. The apparatus of claim 16, wherein the first and second magnetizations maintain crossed and opposite pointing orientations in response to an adjacent data bit.

19. A method comprising:
depositing first and second magnetically free layers to form a magnetic stack, each magnetically free layer with a stripe height from an air bearing surface (ABS) that is greater than a length of a rear bias magnet, the stripe height corresponding to a shape anisotropy having a first easy axis direction; and
configuring the first and second magnetically free layers respectively with first and second uniaxial anisotropies crossed in relation to the ABS and angled at non-orthogonal directions different than the first easy axis direction, the non-orthogonal directions oriented substantially towards the ABS, the first and second magnetically free layers respectively comprising first and second magnetizations angled to match the first and second uniaxial anisotropies.

20. The method of claim 19, wherein the first and second magnetically free layers are annealed with a predetermined temperature along a transverse axis of the magnetic stack.

* * * * *